United States Patent
Petty

(10) Patent No.: US 11,238,356 B2
(45) Date of Patent: Feb. 1, 2022

(54) METHOD OF PREDICTING STREAMFLOW DATA

(71) Applicant: University of Alaska Fairbanks, Fairbanks, AK (US)

(72) Inventor: Timothy R. Petty, Washington, DC (US)

(73) Assignee: University of Alaska Fairbanks, Fairbanks, AK (US)

( * ) Notice: Subject to any disclaimer, the term of this patent is extended or adjusted under 35 U.S.C. 154(b) by 837 days.

(21) Appl. No.: 16/016,243

(22) Filed: Jun. 22, 2018

(65) Prior Publication Data

US 2018/0373993 A1 Dec. 27, 2018

Related U.S. Application Data

(60) Provisional application No. 62/524,022, filed on Jun. 23, 2017.

(51) Int. Cl.
| | |
|---|---|
| *G06N 5/04* | (2006.01) |
| *G06N 5/02* | (2006.01) |
| *G08B 31/00* | (2006.01) |
| *G06N 7/00* | (2006.01) |
| *G06N 5/00* | (2006.01) |
| *G06N 20/20* | (2019.01) |
| *G06F 30/20* | (2020.01) |
| *G06N 20/10* | (2019.01) |
| *G06N 3/12* | (2006.01) |
| *G06F 111/10* | (2020.01) |

(52) U.S. Cl.
CPC ............ *G06N 5/046* (2013.01); *G06F 30/20* (2020.01); *G06N 5/003* (2013.01); *G06N 5/025* (2013.01); *G06N 7/005* (2013.01); *G06N 20/20* (2019.01); *G08B 31/00* (2013.01); *G06F 2111/10* (2020.01); *G06N 3/126* (2013.01); *G06N 20/10* (2019.01)

(58) Field of Classification Search
None
See application file for complete search history.

(56) References Cited

U.S. PATENT DOCUMENTS

| | | | | |
|---|---|---|---|---|
| 7,136,756 | B1* | 11/2006 | Vieux | G06T 17/05 702/5 |
| 10,754,061 | B2* | 8/2020 | Beck | G01W 1/14 |
| 2019/0316309 | A1* | 10/2019 | Wani | E02B 1/02 |

OTHER PUBLICATIONS

Kim et al., Comparative Studies of Different Imputation Methods for Recovering Streamflow Observation, Water 2015, 7, pp. 6847-6860 (Year: 2015).*

(Continued)

*Primary Examiner* — Alan Chen
(74) *Attorney, Agent, or Firm* — Plumsea Law Group, LLC

(57) ABSTRACT

A system and method for generating synthetic streamflow data for a malfunctioning streamgage is provided. The method uses both classification and regression techniques to accurately predict streamflow data for the malfunctioning streamgage based on measured streamflow data from other streamgages and based on correlations between the streamgages. The system and method may also provide a method of improved flood forecasting, by updating flood forecasts using synthetic streamflow data when measured streamflow data from one or more streamgages are unavailable. The system may generate flood forecast information and/or flood warning messages.

27 Claims, 6 Drawing Sheets

(56) References Cited

OTHER PUBLICATIONS

Kim, M.H., Morlock, S.E., Arihood, L.D., and Kiesler, J.L., 2011, Observed and forecast flood-inundation mapping application—A pilot study of an eleven-mile reach of the White River, Indianapolis, Indiana: U.S. Geological Survey Scientific Investigations Report 2011-5138; Total pp. 75 (Year: 2011).*

Ng. et al., Comparative Studies in Problems of Missing Extreme Daily Streamflow Records, Journal of Hydrologic Engineering, Jan. 2009; pp. 91-100 (Year: 2009).*

Sivakumar, B. et al. Complex networks for streamflow dynamics. Hydrology and Earth System Sciences, 18, 4565-4578, 2014.

Archfield, S.A. et al. Map correlation method: Selection of a reference streamgage to estimate daily streamflow at ungaged catchments, Water Resources Research, Vo. 46, W10513, 2010.

Petty, Timothy R. et al. Flood Forecasting GIS Water-Flow Visualization Enhancement (WaVE): A Case Study, Journal of Geographic Information System, 8, 692-728, 2016.

Booker, D. J. et al. Comparing and combining physically-based and empirically based approaches for estimating the hydrology of ungauged catchments. Journal of Hydrology, 508, 227-239, 2014.

Wainer, J. Comparison of 14 different families of classification algorithms on 115 binary datasets, published in arXiv:1606.00930v1, Jun. 6, 2016.

* cited by examiner

METHOD OF PREDICTING STREAMFLOW DATA

CROSS-REFERENCE TO RELATED APPLICATIONS

This application claims priority to U.S. Provisional Patent Application No. 62/524,022, filed Jun. 23, 2017, and titled "Method of Predicting Streamflow Data", the entirety of which is herein incorporated by reference and referred to throughout the present application as "The Streamflow Data Application".

BACKGROUND

Continuity and accuracy of streamflow gauge (streamgage) data are critical for hydrological prediction systems and effective decision-making in flood forecasting and flood impact reduction activities during flood events. There are two main categories of impact reduction activities: mitigation and risk awareness (knowledge of the actual and potential elevation and spatial extent of flooding). Risk awareness is largely dependent on the collection, analysis, and communication of accurate hydrologic data from various sources, one of the most important of which is real-time and historical streamflow data provided by government entity streamgages (e.g., U.S. Geological Survey streamgages).

The elevation and volume of water flow within any watershed basin typically fluctuate in accordance with such weather events and variables as melting snow, rain, surface runoff, subsurface flow and, in regulated streams, by such variables as dams, storage reservoirs, and levees. Streamgages are devices that monitor and test surface bodies of water within watershed basins, with their primary function generally being the hydrologic measurements of water level surface elevation (also referred to as 'gage height' or stream 'stage'). The volumetric amount of water flowing in a stream (discharge) is calculated with a formula that uses a mathematical rating curve to correlate stage measurements (in feet or meters) to corresponding discharge measurements (in cubic feet per second or cubic meters per second respectively). Physical discharge measurements are collected over both time and range of stages (from low flow to flood stage) to develop the rating curve, and the stage-discharge relation varies for every streamgage according to stream topography. But because of the strong mathematical relation between elevation and discharge, a continuous record of streamflow can be calculated by continuously measuring water elevation.

Streamflow data are transmitted in near real-time directly to the National Weather Service (NWS) and the U.S. Army Corps of Engineers (USACE), where the data are used to prepare daily flood forecasts and to make other decisions. USACE uses streamflow data and NWS precipitation predictions for such flood mitigation activities as managing hundreds of flood control reservoirs, floodway outlets, diversions, levees, and navigation locks. Water managers need timely and accurate forecasts and streamflow data to predict inflows to reservoirs and pool elevations to determine downstream discharge, as well as for daily decisions regarding adjustment of water elevation levels in reservoirs to minimize downstream flooding and maximize storage.

During flooding events, decision makers often rely on real-time water elevation and time data, along with ancillary information such as river velocity and depth, for situational awareness and such emergency operations as fighting floods, evacuations, closing bridges, rivers, and roads, etc. During flooding events, streamgages damaged by high water and debris can stop transmitting data, thus limiting the situational awareness of decision makers and first responders and their ability to effectively allocate resources, enable evacuations, and reduce property losses. Because uninterrupted transmittal of accurate streamflow data is critical for decisions based on flood forecasts and unfolding real-time events, any missing data due to disruption has significant and wide-ranging implications.

SUMMARY

In one aspect, a method for improving the accuracy of generating synthetic streamflow data if there is an interruption in measured streamflow data from a target streamflow source is provided. The method includes steps of: (1) receiving measured streamflow data related to a plurality of streamflow sources, the plurality of streamflow sources including the target source; (2) using the measured streamflow data to classify the plurality of streamflow sources into two or more groups; and (3) using information about the two or more groups to generate synthetic streamflow data for the target streamflow source if there is an interruption in measured streamflow data from the target streamflow source.

In another aspect, a method for improving the accuracy of generating synthetic streamflow data if there is an interruption in measured streamflow data related to a target streamflow source is provided. The method includes steps of: (1) receiving measured streamflow data related to a plurality of streamflow sources, the plurality of streamflow sources including the target source; (2) receiving clustering information about the plurality of streamflow sources; (3) creating a predictive model using the measured streamflow data and the clustering information; and (4) using the predictive model to generate synthetic streamflow data for the target streamflow source if an interruption in measured streamflow data from the target streamflow source has been determined.

In another aspect, a method for improving the accuracy of flood forecasting is provided. The method includes steps of: (1) receiving measured streamflow data from a plurality of streamflow sources, the plurality of streamflow sources including a target streamflow source; (2) generating flood forecast information using the measured streamflow data; (3) determining that there has been an interruption in the receiving of streamflow data from the target streamflow source; (4) retrieving a predictive model; (5) using the predictive model to generate synthetic streamflow data for the target streamflow source; and (6) updating the flood forecast information using the synthetic streamflow data.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, with emphasis instead being placed upon illustrating the principles of the embodiments. Moreover, in the figures, like reference numerals designate corresponding parts throughout the different views.

DETAILED DESCRIPTION

Embodiments of a method of determining streamflow data are disclosed. As used herein, the terms "streamflow data" refers to one or more kinds of hydrological information that may be gathered about a body of water. Examples of streamflow data include, but are not limited to: water level surface elevation (or gage height or stream stage), water depth, flow rates, discharge rates, as well as other kinds of information. Throughout the disclosure "streamflow information", "streamflow gauge data" and/or "streamgage data" may be used interchangeably with "streamflow data." In some embodiments, streamflow data may refer to specific hydrological information that is gathered using a measuring device such as a streamgage (or stream gauge). As used throughout the current disclosure, the term "bodies of water" may refer to various different kinds of watershed basins including, but not limited to: streams, rivers and other waterways (including both natural and manmade waterways). Such bodies of water may be gauged (i.e., include measuring devices used to measure one or more kinds of streamflow data) or ungauged.

The embodiments provide systems and methods for generating synthetic streamflow data that may be used when measured streamflow data (i.e., data gathered from streamgauges) from one or more sources are not available (e.g., during flooding). More specifically, the embodiments use artificial intelligence (machine learning) to improve both the accuracy and availability (in time) of synthetic streamflow data. The present method improves on accuracy of the synthetic streamflow data by using correlation and clustering methods to determine statistical relationships between different streamgages in a geographic region prior to training a predictive model. Also, because the present method uses a predictive model that has been trained on historical streamflow data, the model is capable of generating real-time or near real-time synthetic streamflow data as soon as an interruption in measured streamflow data is detected. This allows other systems, like flood forecasting systems that depend on real-time or near real-time streamflow data, to operate even when some measured data becomes unavailable, such as may occur during flooding conditions. Additionally, the present method provides a more efficient predictive model than previously known models. Specifically, previous models have employed complicated multivariate models that require the collection and cleaning of a wide range of different kinds of data, including distance relationships between streamgages, variability, degree of regulation and other local attributes. By contrast, some embodiments of the present method uses a predictive model trained on streamflow data without requiring the use of various other kinds of data, and also builds correlation and clustering information using only streamflow data. Thus, the present approach allows a predictive model to be built more quickly than more conventional models.

Figure 1:
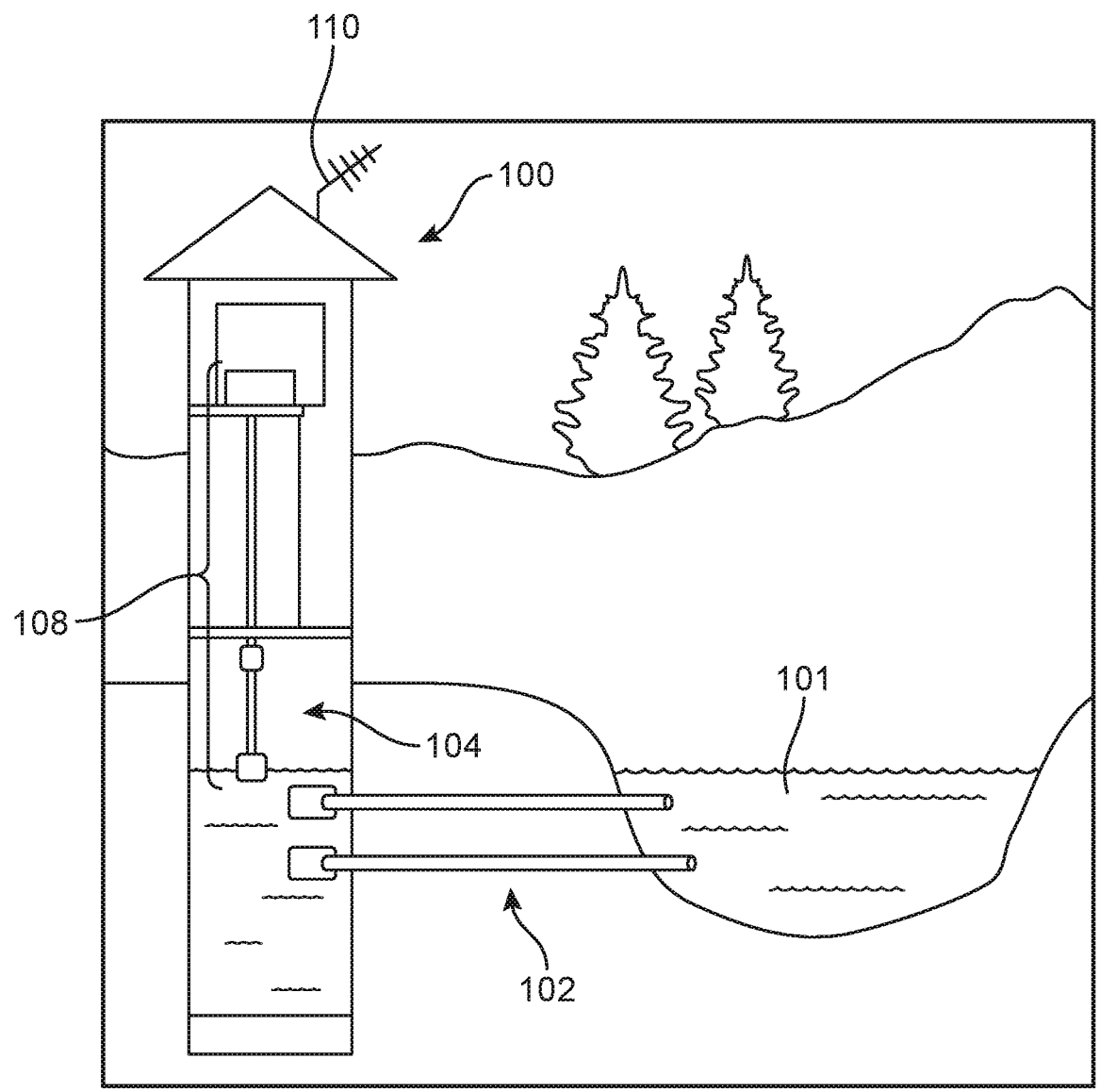
FIG. 1 is a schematic view of an embodiment of a streamgage.

FIG. 1 is a schematic view of an embodiment of a streamgage 100. As used herein, a "streamgage" is a device that provides measurements of streamflow data (e.g., in a given river, stream or other body of water). In some embodiments, a streamgage may be a device that continuously operates to provide regular streamflow measurements (e.g., real-time measurements, mean hourly measurements, mean daily measurements, etc.). As an example, the United States Geological Survey (USGS) operates streamgages that are intended to provide mean daily streamflow data for at least 355 days of a given 365 day period.

Referring to FIG. 1, a streamgage may include various components such as intake lines 102 that allow water from a neighboring stream 101 to enter an interior chamber 104 of streamgage 100. The water surface level 106 inside the streamgage is detected and recorded by measurement and recording system 108. The measurements of water level height may be made using any known technology including, for example, ultrasonic devices, stage encoders and electromagnetic gauges. It may be appreciated that any kind of streamgage known in the art could be used, including any devices owned and/or operated by the USGS. Streamflow data may be transmitted to other devices or systems from streamgage 100 using a radio antenna 110.

Figure 2:
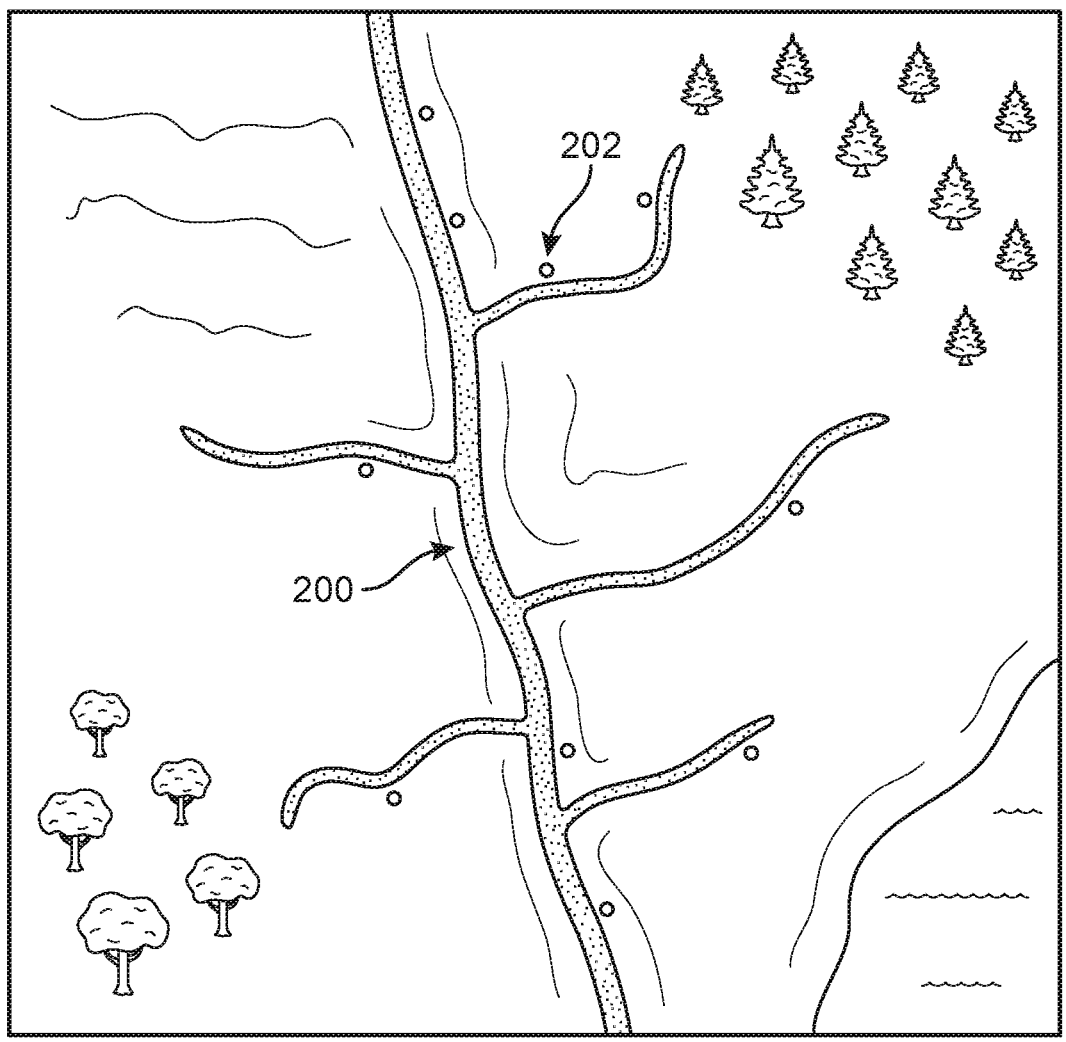
FIG. 2 is a schematic view of an embodiment of a network of streamgages along a river and connected streams.

To provide regional information about streamflow data a system or network of streamgages may be operated along any streams, rivers or other bodies of water in a particular region. FIG. 2 is an exemplary embodiment of a geographic region that includes a plurality of waterways 200. A network of streamgages 202 may be positioned along waterways 200 (e.g., rivers and streams). The network of streamgages 202 provides real-time, near real-time or otherwise regularly updated streamflow data at various points through the rivers and streams of waterways 200. This streamflow data can be used to monitor, and/or predict, flooding conditions throughout the region. The present embodiments provide a method for predicting real-time or near real-time data at one or more locations associated with streamgages 202 in situations where streamflow data from one or more of the streamgages has been interrupted.

Figure 3:
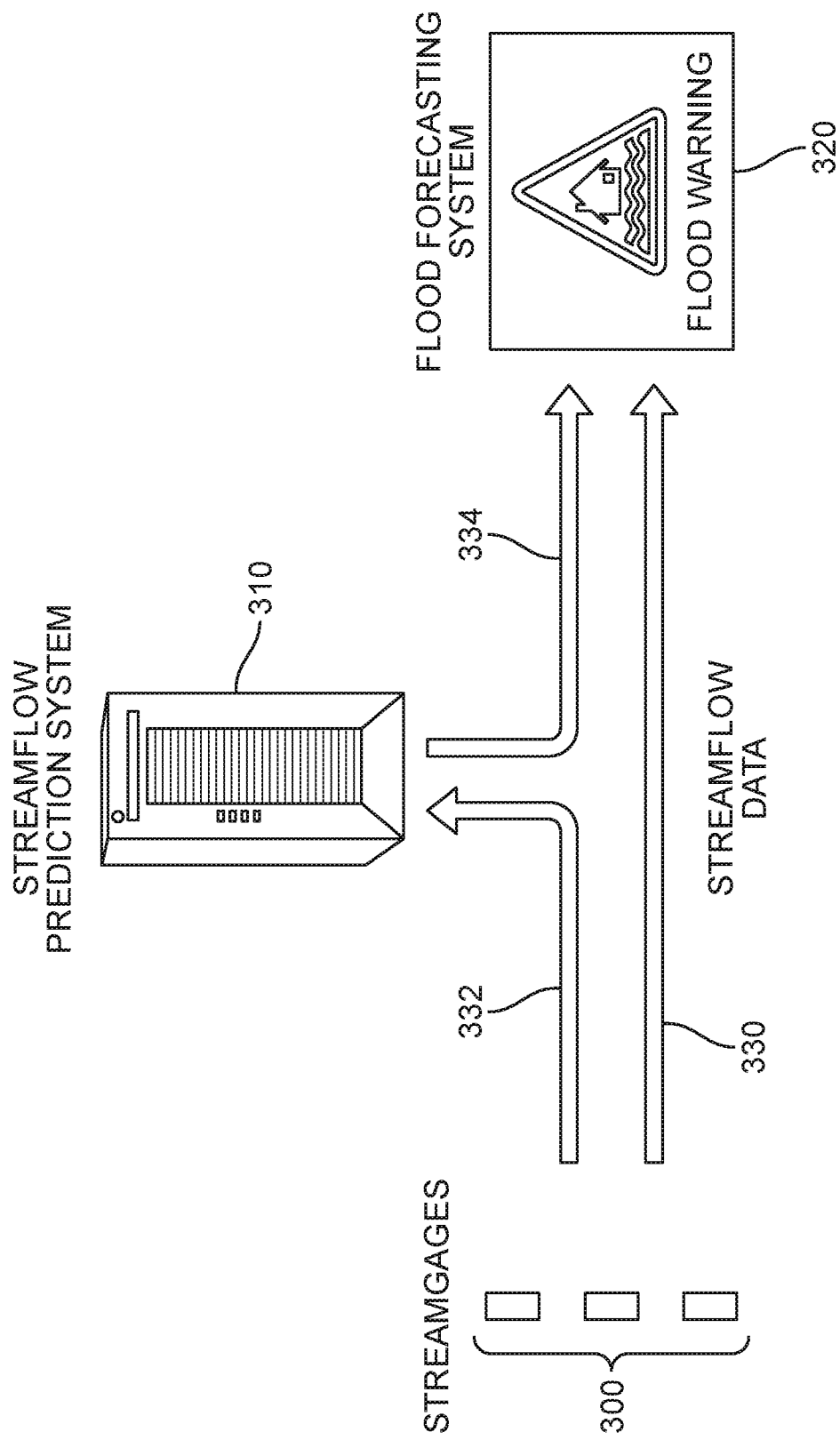
FIG. 3 is a schematic view of an embodiment of a system for streamflow prediction and flood forecasting.

FIG. 3 is a schematic view of components that may be used to predict streamflow data for use in flood forecasting, according to an embodiment. Streamflow data may be gathered from a collection of streamgages 300. For purposes of illustration only a few streamgages are shown in FIG. 3, however it may be understood that streamflow data from any number of streamgages can used. In some cases, streamgages 300 comprise a network of streamgages associated with a particular geographic region and may include streamgages located along one or more rivers or streams, as in the example of FIG. 2. Moreover, any type of streamgage known in the art could be used, including the exemplary streamgage 100 described above and shown in FIG. 1.

Streamflow data from streamgages 300 may be provided directly to other systems. For purposes of clarity, the terms measured streamflow data and predicted streamflow data are used to differentiate between different sources of streamflow data. As used herein, the term "measured streamflow data" refers to data produced by making physical measurements of streamflow quantities (e.g., stream height, stream velocity, etc.). This data may be generated by streamgages. By contrast, the term "predicted streamflow data" (or "synthetic streamflow data") refers to data produced by a predictive model.

As seen in FIG. 3, in one embodiment measured streamflow data 330 from streamgages 300 may be provided to a flood forecasting system 320. A flood forecasting system may be any system that monitors, predicts, or otherwise transmits information related to flooding conditions in a region. In the embodiment of FIG. 3, flood forecasting system 320 may use streamflow data from streamgages 300 to forecast flooding along one or more rivers or streams associated with streamgages 300. In some cases, flood forecasting system 320 generates information related to flooding conditions. In some cases, flood forecasting system 320 may generate a flood warning.

It may be appreciated that a flood forecasting system could include both automated and manual components. Some flood forecasting systems may utilize algorithms for building models or simulations of river and stream conditions in a geographic region while also requiring the manual input or observations of human operators to make decisions about the appropriate flood warning type or whether a warning should be issued at all. In some other embodiments, a flood forecasting system may be operated automatically with minimal human operator oversight.

One possible flood forecasting system may include the Water-flow Visualization Enhancement (WaVE) system that is disclosed in The Streamflow Data Application. The WaVE system integrates geospatial analytics visualization with additional tools to provide several features. In some cases, the system provides dynamically generated on-the-fly, highly granular and interactive geovisual real-time and predictive flood maps that can be scaled down to show discharge, inundation, water velocity, and ancillary geomorphology and hydrology data from the national level to regional and local level. In some cases, the system provides integrated data and model analysis from multiple sources. In some cases, the system provides interpolation of streamflow proxy estimates for non-functioning streamgages and extrapolation of discharge estimates for ungaged streams. In some cases, the system provides time-scaled drill-down visualization of real-time and forecasted flood events. In other embodiments, any flood simulating and/or forecasting system that makes use of real-time or near real-time streamflow data could be used.

As seen in FIG. 3, measured streamflow data 332 may also be passed to a streamflow prediction system 310. Streamflow prediction system 310 comprises one or more resources that can analyze streamflow data, build and/or use predictive models for generating predicted (i.e., synthetic) streamflow data, and pass the synthetic streamflow data 334 to flood forecasting system 320. Thus it may be appreciated from FIG. 3 that a flood forecasting system 320 may utilize both predicted/synthetic streamflow data (for streamgages that are not functioning) and measured streamflow data (for functioning streamgages).

Streamflow prediction system 310 and flood forecasting system 320 may each include one or more of a server, a database, and a network. For example, streamflow prediction system 310 could run on a server and could communicate with streamgages 300 (or a database of streamflow data collected from streamgages 300) over a network. Likewise, flood forecasting system 320 could run on a server and could communicate with streamgages 300 and/or streamflow prediction system 310 over a network. In some embodiments, the network may be a wide area network ("WAN"), e.g., the Internet. In other embodiments, the network may be a local area network ("LAN"). In yet other embodiments, the network may be a combination of a WAN and a LAN.

One or more resources of streamflow prediction system 310 and flood forecasting system 320 may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

Although the embodiment of FIG. 3 depicts streamflow prediction system 310 and flood forecasting system 320 as separate systems, in other embodiments these could be part of a single system running on one or more co-located servers. Moreover, in at least one alternative embodiment, streamflow prediction system 310 may comprise a subsystem of a more comprehensive flood forecasting system 320, such as the WaVE system described above.

The process of predicting streamflow data for a target streamgage (e.g., a streamgage that has stopped functioning and/or transmitting data) may proceed in three phases. During a first phase, historical streamgage data is collected and analyzed to determine any correlations between streamgages in a given network. Next, during a second phase, the correlations determined in the first phase are used along with additional historical streamflow data to train a predictive model (i.e., a machine learning model) to accurately predict streamflow information from one source based on streamflow data from other sources in the streamgage network. In other words, the correlation data generated during the first phase becomes part of the training data that is used to train the predictive model during the second phase. In a third phase, the predictive model is used to generated predicted (synthetic) streamflow data for a malfunctioning streamgage. In contrast to the first two phases, which require time to analyze historical streamflow data and train a predictive model, the third phase can be actualized in real-time or near real-time as soon as a problem with a particular streamgage has been identified, thus allowing synthetic streamflow data to be used for real-time or near real-time flood forecasting.

Figure 4:
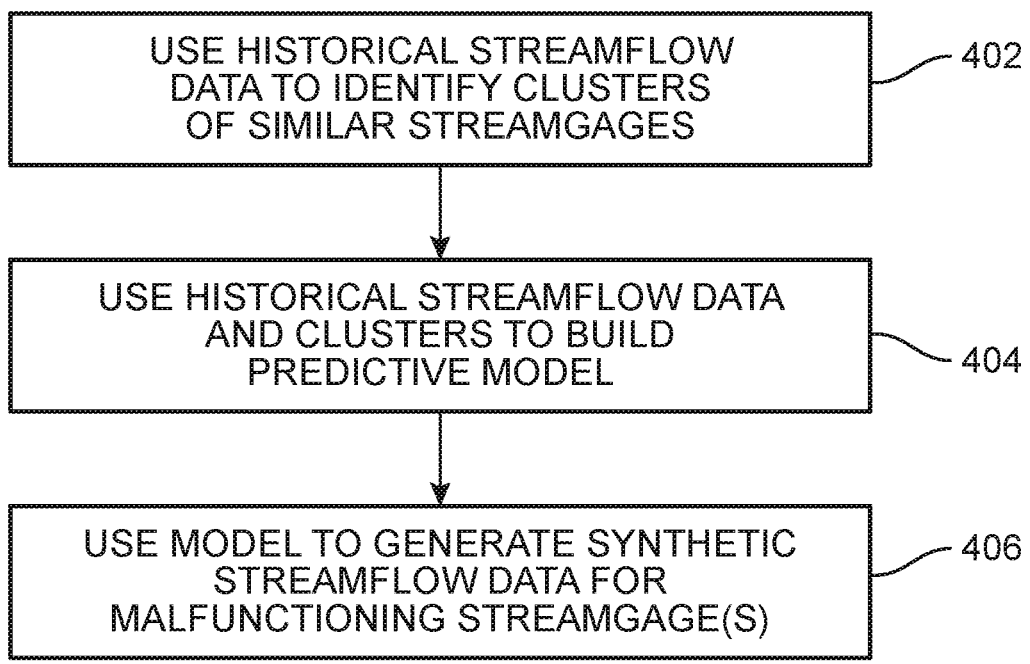
FIG. 4 is a schematic process for generating synthetic streamflow data for a malfunctioning streamgage, according to an embodiment.

FIG. 4 is a schematic view of a process for predicting streamflow data according to an embodiment. In step 402, historical streamflow data (streamflow data that was previously measured and recorded) is used to identify clusters of similar streamgages. During this step, a regional watershed of interest is selected. Then a historical baseline of streamflow data is built using measured streamflow data at streamgages in the selected regional watershed. In some cases, the historical streamflow data may be obtained from the National Water Information System (NWIS), which is provided by the USGS. Prior to analysis, streamgage data may be imported, formatted, cleaned, and prepared.

To quantify the discharge rate network pattern within the watershed and to create a historical profile (a yearly event), the method may use two or more regression analysis methodologies to find correlations between streamgages and clusters of streamgage correlations. In some cases, the following two correlations may be used. First, correlations of hydrological data between two or more sources may make use of Pearson's 'r', which is a statistic that measures the linear correlation between two variables X and Y. Any of the methods of computing Pearson's 'r' known in the art could be used in an embodiment. In some cases, the reliability and validity of these correlation results may be analyzed using known methods (e.g., sweep parameter, tests and scoring).

Next, clustering coefficient analysis is used to examine the connections within the streamflow network and group the streamgages into sets (clusters) according to degrees of specific correlation. Embodiments may also make use of one or more kinds of techniques from cluster analysis. These include any techniques capable of performing the task of separating a set of objects into two or more groups, or "clusters," which share one or more features. The embodiments may make use of any known clustering algorithms including, but not limited to: hierarchical clustering, k-means clustering, distribution based clustering algorithms, density based clustering algorithms, group based clustering algorithms (e.g., highly connected subgraphs clustering) as well as any other clustering methods. In some embodiments, during step 402, the correlation clusters may be validated using known methods, some of which are described in The Streamflow Data Application.

In step 404, historical streamflow data are used with the correlation information and clusters determined during step 402 to build a predictive model. During this stage a machine learning algorithm is trained to identify patterns of high correlations and clustering of streamgages in a given watershed region using the previously determined correlation and clustering information. Then historical streamflow data is used to train the algorithm to predict streamflow output for each streamgage.

In some embodiments, the machine learning algorithm used during step 404 may be a regression-type algorithm. Embodiments may make use of various regression type machine learning algorithms including, but not limited to: Monte Carlo methods, Multi-Classification methods, and Decision Tree methods (e.g., boosted decision trees). Some embodiments make use of Random Forests for predicting one or more kinds of streamflow data. Random Forests use an ensemble of decision trees and output the mean prediction of the ensemble to limit overfitting. A detailed explanation of the application of Random Forest models to predicting streamflow data is provided in The Streamflow Data Application.

Once a predictive model has been built, the process proceeds to step 406. In step 406 the predictive model built in step 404 is used to generate predicted streamflow data (i.e., expected values of what the streamflow data would be were the streamgage functioning properly). As a specific example, the predictive model may be used when a streamgage is identified as malfunctioning (e.g., the transmitter is broken or the measuring equipment is broken). In some cases, data may be transmitted from a malfunctioning streamgage and may be obviously inaccurate (showing wildly unrealistic values, for example). Once a streamgage has been identified as missing data, or providing erroneous data, data from other streamgages in a given region or network may be fed into the predictive model, which outputs synthetic streamflow data (corresponding to the malfunctioning streamgage) in real-time or near real-time.

More generally, the predictive model is capable of generating synthetic streamflow data having a similar temporal resolution to the measured streamflow data. For example, if a network of streamgages provide measured streamflow values at a regular period P, the predictive model can generate synthetic streamflow values at the same regular period P. Likewise, the predictive model can generate synthetic data for any arbitrary sequence of times at which measured streamflow values may be provided. This generated synthetic data is similar to a predicted simulation of the actual data that would have been provided if the particular streamgage was operational.

Figure 5:
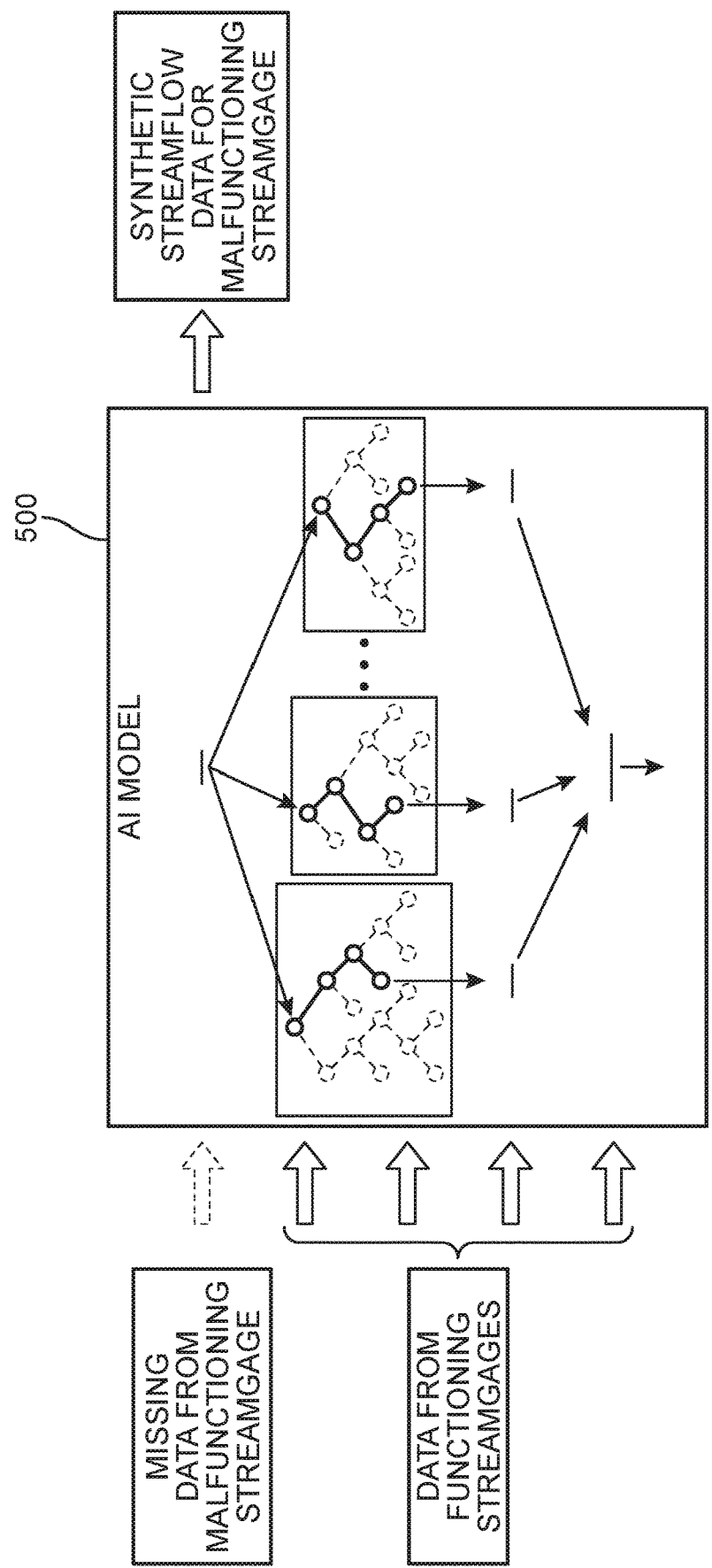
FIG. 5 is a schematic view of an embodiment of a predictive model for generating synthetic streamflow data.

Referring to FIG. 5, a predictive model 500 (i.e., a machine learning or AI model) receives measured streamflow data for all properly functioning streamgages in a given region or network as input. However, data is missing from a malfunctioning streamgage in the network, as indicated schematically in FIG. 5. Predictive model 500 outputs synthetic streamflow data for the malfunctioning streamgage so that data for all streamgages can be passed along to a flood forecasting system. Though not shown in FIG. 5, data from the functioning streamgages can be passed directly to a flood forecasting system or another system, as depicted in FIG. 3. In some embodiments, a predictive model could receive measured streamgage data as input and then output that same measured streamgage data along with synthetic data for one or more malfunctioning streamgages.

In some embodiments, a predictive model may take as input data that was generated by a malfunctioning streamgage prior to the moment when the data from the streamgage was interrupted or corrupted in addition to receiving data from other streamgages. For example, if accurate data from a streamgage is received at a series of times t1, t2, t3, t4 and then at time t5 the data is missing or corrupted, a predictive model could use data associated with times t1, t2, t3 and t4 as input. The predictive model could also receive data from earlier times as well and in general the number of earlier data points to be used could be considered as a meta-parameter of the predictive model to be optimized. Moreover, in some embodiments, historical data for the malfunctioning streamgage may also be considered as an input to a predictive model.

Figure 6:
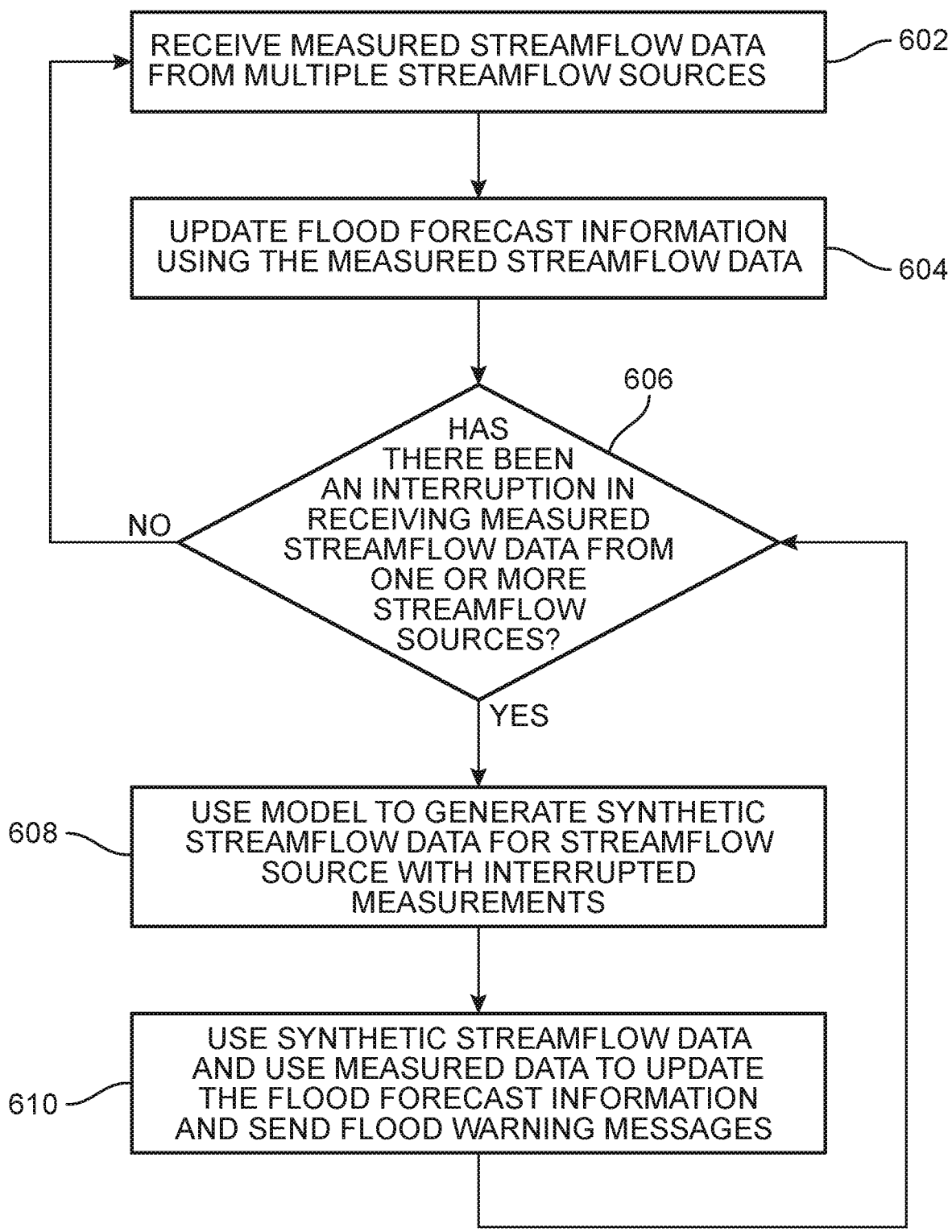
FIG. 6 is a schematic process for updating a flood forecast based on synthetic streamflow data, according to an embodiment.

In some embodiments, predicted streamflow data can be used in combination with a flood forecasting system to improve the accuracy of forecasts even when measured streamflow data from one or more streamgages is unavailable. FIG. 6 is a schematic view of a method for generating synthetic (predicted) streamflow data and using the data to generate information or messages related to a flooding (e.g., flood warnings), according to an embodiment. In this exemplary embodiment, one or more steps may be performed by a flood forecasting system that includes a predictive model to generate synthetic streamflow data when data is interrupted from one or more streamgages. In one embodiment, the flood forecasting system could be the WaVE system described above in reference to FIG. 2. In other embodiments, however, streamflow prediction and flood forecasting could be performed by distinct systems in communication with one another.

In step 602, the flood forecasting system may receive measured streamflow data from various sources (e.g., streamgages). In some cases, the data may be received directly from streamgages that are transmitting data, while in other cases the data may be received from one or more centralized databases, which receive the data from the streamgages. It may be appreciated that this may be an ongoing step and that measured streamflow data can be continuously updated even as the system proceeds through the following steps.

Using the measured streamflow information from step 602, along with possibly other input information, the system updates flood forecast information in step 604. When the system first starts, step 604 may comprise generating an initial flood forecast, rather than updating an existing one.

Other input information that can be provided to the flood forecasting system at step 604 can include remote sensing data. Examples of remote sensing data that could be used include, but are not limited to, elevation data, image data (for identifying inundation, for example), as well as other kinds of data.

Flood forecast information provided at step 604 could take a variety of forms including, for example, a flood map. Flood forecast information can further include information about flood occurrences and the inundation extent of flooding. It may be appreciated that flood forecast information can provide information on current flood conditions and/or future flood conditions. Flood forecast information may also include information or messages pertaining to communicating risks and consequences of current and predicted flooding (e.g., flood warning messages).

Following this, in step 606, the system determines if there has been an interruption in receiving the measured streamflow data for one or more of the streamflow sources. As discussed above, interruptions may occur for various reasons including malfunctions of a streamgage resulting from excessive flooding in the vicinity of the streamgage. If the system determines that no interruption has occurred, it returns to receiving measured streamflow from all the streamflow sources at step 602.

If, during step 606, the system determines that there has been an interruption in streamflow data from a streamflow source, the system proceeds to step 608. In step 608, the system uses a predictive model that had previously been created, for example, during step 402 and step 404 of the process shown in FIG. 4 and described above. The output from the predictive model is a stream of real-time, near real-time, or otherwise regularly updated synthetic streamflow data providing an accurate prediction about streamflow conditions at the streamflow source with interrupted measurements (also referred to as the 'target' source).

In step 610, the system uses the synthetic streamflow data from the target source and the measured streamflow data from other sources to update the flood forecast information. For example, using the synthetic streamflow data from the malfunctioning streamflow source along with measured streamflow data from other sources, a flood map or other flood simulation or forecast could be updated. Optionally, in some embodiments, information or messages related to a flood warning could be communicated to another system or party. Communicating messages may include sending flood warning information to a broadcaster that can provide radio and/or television alerts about the flood. Communicating messages may also include sending flood warning information to a weather website, which can provide flood warnings to users of the website. In another embodiment, the system sends information about flood warnings or other conditions to another forecasting service, such as the National Weather Service, which may use the information to determine if flood warnings should be issued.

Following step 610, the system may recheck to see if there is still an interruption in streamflow data from the target source and/or if a new interruption has occurred, at step 606. If there are no longer any interruptions, the system may return to step 604 to update the flood forecasting map using measured streamflow data (without using any synthetic streamflow data). If there are still interruptions the system can return to step 608 to continue generating synthetic streamflow data for one or more streamflow sources to be used in further flood forecasting updates (step 610).

Embodiments may use any other known machine learning methods for one or more steps. Such machine learning methods may include, but are not limited to: artificial neural networks (including various deep learning networks), Bayesian networks, dimensionality reduction techniques (e.g., factor analysis, flexible discriminant analysis, linear discriminant analysis and principle component analysis), ensemble learning techniques, regression techniques (e.g., logistic regression, ordinary least squares regression, linear regression, stepwise regression, multivariate adaptive regression splines (MARS) and locally estimated scatterplot smoothing (LOESS)), regularization techniques (e.g., ridge regression, least absolute shrinkage and selection operator (LASSO), elastic nets and least-angle regression (LARS)), support vector machines, ANOVA, Hidden Markov models, genetic algorithms as well as other kinds of methods. Embodiments can further make used of any of the methods disclosed in The Streamflow Data Application.

Embodiments can use any known methods for hyperparameter optimization, in which one or more parameters for a machine learning algorithm are selected. These methods can include grid search techniques, bayesian optimization, random searches, and gradient based optimization. For example, Microsoft Azure includes a "Sweep Parameters" module that can be used to automatically tune hyperparameters for a given technique.

Embodiments can use any known methods for training and/or validating predictive models. For example, some embodiments may use cross-validation techniques in which data is partitioned into a training set and a validation set. Exemplary methods of cross validation that could be used in one or more embodiments include, but are not limited to: leave-p-out cross-validation, k-fold cross-validation, and the holdout method.

Machine learning methods and other numerical techniques can be performed using any kinds of software and frameworks. Embodiments could implement one or more techniques using Scikit Learn (a Python language framework), machine learning frameworks in the R language, Octave, machine learning packages in Matlab, machine learning packages in Mathematica, Microsoft Azure ML Studio, Apache Spark MLlib, Amazon Machine Learning, Caffe, Tensorflow as well as other machine learning frameworks known in the art.

While various embodiments are described, the description is intended to be exemplary, rather than limiting and it will be apparent to those of ordinary skill in the art that many more embodiments and implementations are possible that are within the scope of the embodiments. Although possible combinations of features are shown in the accompanying figures and discussed in this description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

For example, the embodiments disclose methods and for correlating various kinds of streamflow data from two or more sources (e.g., from two or more different streams), for creating predictive models for streamflow data, for using data and predictive models to estimate values of streamflow data at one or more different sources and for forecasting flooding events. It may be appreciated that these methods may be used in isolation or in combination, including any combinations of any methods described herein. Moreover, some of the methods described herein may be optional and in other embodiments some methods could be replaced with another method or may simply be removed.

What is claimed is:

1. A method for improving the accuracy of generating synthetic streamflow data if there is an interruption in measured streamflow data from a target streamflow source, the method comprising:
   receiving measured streamflow data related to a plurality of streamflow sources, the plurality of streamflow sources including the target streamflow source and at least one other streamflow source disposed in a different location from the target streamflow source;
   clustering the plurality of streamflow sources, using the measured streamflow data, into two or more groups of streamflow sources based on correlations between streamflow sources in the plurality of streamflow sources; and
   using information about the two or more groups of streamflow sources to generate synthetic streamflow data for the target streamflow source if there is an interruption in measured streamflow data from the target streamflow source.

2. The method according to claim 1, wherein the streamflow data includes water level surface height.

3. The method according to claim 2, wherein the method includes determining that a measurement device configured to provide water level surface height data from the target streamflow source is malfunctioning.

4. The method according to claim 1, wherein the target streamflow source is located along a first stream and wherein the at least one other streamflow source is located along a second stream, wherein the second stream is different from the first stream.

5. The method according to claim 1, wherein the method includes building a predictive model from the measured streamflow data related to the plurality of streamflow sources and from the information about the two or more groups of streamflow sources.

6. The method according to claim 1, wherein the method includes:
   receiving streamflow data transmitted by a measurement device at the target streamflow source;
   determining that the measurement device has ceased to transmit streamflow data; and
   predicting streamflow data associated with the measurement device after determining that the measurement device has ceased to transmit streamflow data.

7. A method for improving the accuracy of generating synthetic streamflow data if there is an interruption in measured streamflow data related to a target streamflow source, the method comprising:
   receiving measured streamflow data related to a plurality of streamflow sources, the plurality of streamflow sources including the target streamflow source;
   receiving clustering information about the plurality of streamflow sources;
   creating a predictive model using the measured streamflow data and the clustering information;
   using the predictive model to generate synthetic streamflow data for the target streamflow source if an interruption in measured streamflow data from the target streamflow source has been determined;
   wherein the predictive model is trained using the measured streamflow data and the clustering information; and
   wherein the predictive model is created using an ensemble of decision trees.

8. The method according to claim 7, wherein the target streamflow source is a target streamgage and wherein the plurality of streamflow sources is a plurality of streamgages.

9. The method according to claim 7, wherein the streamflow sources in the plurality of streamflow sources are separated geographically.

10. The method according to claim 7, wherein at least two streamflow sources in the plurality of streamflow sources are located along different streams.

11. The method according to claim 7, wherein the predictive model is a random forest model.

12. The method according to claim 7, wherein the measured streamflow data and the synthetic streamflow data have the same temporal resolutions.

13. A method for improving the accuracy of flood forecasting, the method comprising:
   receiving measured streamflow data from a plurality of streamgages, the plurality of streamgages including a target streamgage and at least one other streamgage disposed in a different location from the target streamgage;
   clustering the plurality of streamgages, using the measured streamflow data, into two or more groups of streamgages based on correlations between streamgages in the plurality of streamgages;
   building a predictive model, using the two or more groups of streamgages, to predict synthetic streamflow data for any streamgage in the plurality of streamgages;
   generating flood forecast information using the measured streamflow data;
   determining that there has been an interruption in the receiving of streamflow data from the target streamgage;
   retrieving the predictive model;
   using the predictive model to generate synthetic streamflow data for the target streamgage; and
   updating the flood forecast information using the synthetic streamflow data.

14. The method according to claim 13, wherein the predictive model receives as input at least some of the measured streamflow data from the plurality of streamgages.

15. The method according to claim 13, wherein the method further includes generating a flood warning message according to the updated flood forecast information.

16. The method according to claim 13, wherein the predictive model comprises a decision tree model.

17. The method according to claim 13, wherein building the predictive model includes a step of training the predictive model using measured streamflow data from the plurality of streamgages including measured streamflow data from the target streamgage.

18. The method according to claim 13, wherein the measured streamflow data and the synthetic streamflow data have the same temporal resolutions.

19. The method according to claim 13, wherein the plurality of streamgages are associated with a geographic region, and wherein the step of generating flood forecast information includes using remote sensing data associated with the geographic region.

20. The method according to claim 13, wherein the flood forecast information comprises a real-time flood map.

21. A system for improving the accuracy of flood forecasting, comprising:
   a streamflow prediction system configured to:
      receive measured streamflow data from a plurality of streamgages, the plurality of streamgages including a target streamgage and at least one other streamgage disposed in a different location from the target streamgage;

cluster the plurality of streamgages, using the measured streamflow data, into two or more groups of streamgages based on correlations between streamgages in the plurality of streamgages;

build a predictive model, using the two or more groups of streamgages, to predict synthetic streamflow data for any streamgage in the plurality of streamgages;

a flood forecasting system configured to:

generate flood forecast information using the measured streamflow data;

determine that there has been an interruption in the receiving of streamflow data from the target streamgage;

retrieve the predictive model from the streamflow prediction system;

use the predictive model to generate synthetic streamflow data for the target streamgage; and update the flood forecast information using the synthetic streamflow data.

22. The system according to claim 21, wherein the predictive model receives as input at least some of the measured streamflow data from the plurality of streamgages.

23. The method according to claim 21, wherein the flood forecasting system is further configured to generate a flood warning message according to the updated flood forecast information.

24. The method according to claim 21, wherein the predictive model comprises a decision tree model.

25. The method according to claim 21, wherein the streamflow prediction system is further configured to build the predictive model by training the predictive model using measured streamflow data from the plurality of streamgages including measured streamflow data from the target streamgage.

26. The method according to claim 21, wherein the measured streamflow data and the synthetic streamflow data have the same temporal resolutions.

27. The method according to claim 21, wherein the plurality of streamgages are associated with a geographic region, and wherein the flood forecasting system is configured to use remote sensing data associated with the geographic region.

* * * * *